United States Patent [19]

Kozaki et al.

[11] 4,240,710

[45] Dec. 23, 1980

[54] HOLDING PLATE FOR A TWISTED NEMATIC ALIGNMENT FIELD EFFECT MODE (TNFEM) LIQUID CRYSTAL DISPLAY

[75] Inventors: Syuichi Kozaki, Nara; Kiyoshi Toda; Fumiaki Funada, both of Yamatokoriyama; Tomio Wada, Nara, all of Japan

[73] Assignee: Sharp Kabushiki Kaisha, Osaka, Japan

[21] Appl. No.: 938,480

[22] Filed: Aug. 31, 1978

[30] Foreign Application Priority Data

Sep. 6, 1977 [JP] Japan .................................. 52/107425

[51] Int. Cl.³ .............................................. G02F 1/133
[52] U.S. Cl. .................................. 350/339 R; 350/341
[58] Field of Search ........................... 350/339 R, 341

[56] References Cited

U.S. PATENT DOCUMENTS

| 3,966,305 | 6/1976 | Young | 350/341 |
| 3,967,883 | 7/1976 | Meyerhofer et al. | 350/341 |
| 3,982,820 | 9/1976 | Hattori et al. | 350/341 |

Primary Examiner—Edward S. Bauer
Attorney, Agent, or Firm—Birch, Stewart, Kolasch and Birch

[57] ABSTRACT

An alignment structure provided in a twisted nematic field effect mode (TN-FEM) liquid crystal display includes, a first insulating layer deposited substantially along the normal direction of one of the supports, a second insulating layer deposited on said first insulating layer in a direction slant to the normal direction of the support, and a third insulating layer deposited on the second insulating layer slant to a direction rotated ninety degrees from said direction while the normal line of the support serves as the rotation axis thereof, thereby providing a three-layer alignment structure.

24 Claims, 5 Drawing Figures

HOLDING PLATE FOR A TWISTED NEMATIC ALIGNMENT FIELD EFFECT MODE (TNFEM) LIQUID CRYSTAL DISPLAY

BACKGROUND OF THE INVENTION

This invention relates to a twisted nematic alignment field effect mode (TNFEM) liquid crystal displaying electro-optically excellent characteristics and chemically stable alignment of the liquid crystal molecules.

As a rule, in twisted nematic filed effect mode (TNFEM) type of liquid crystal display the nematic liquid crystal molecules have a positive dielectric anisotropy and are oriented in parallel with two holding plates defining a liquid crystal cell showing a 90° twisted structure about the interfacial surfaces of the two holding plates.

It is well known that in implementing the above described type of liquid crystal displays the rubbing or evaporation technique is carried out so as to attain molecular alignment in parallel with the surfaces of the holding plates and in a certain direction. See, for example, U.S. Pat. Nos. 3,834,792 and 3,964,158.

It is therefore an object of the present invention to provide an improvement in the latter.

Other objects and many of the attendant advantages of the present invention will be reasily appreciated as the same becomes better understood by reference to the following detailed description which considered in conjunction with the accompanying drawings, and wherein.

Figure 1:
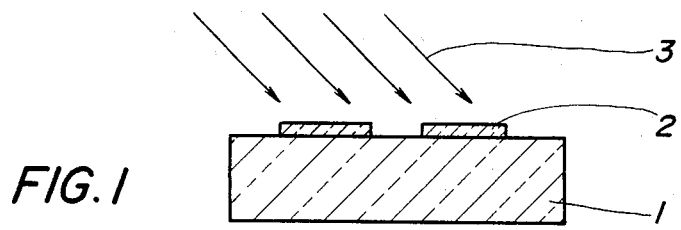
FIG. 1 is a side view for explanation of the slant evaporation technique.

First of all, a prior art evaporation method and its associated problems will be described by reference to FIG. 1. On a glass support 1 there is deposited a transparent conductive film of which the principal constituent is $In_2O_3$, $SnO_2$ or the like, by a conventional manner like an evaporation or spray technique.

The transparent conductive film is etched in a desired pattern to form a pattern electrode 2. Another alternative is a mask evaporation technique. A SiO film or an alignment film 3 is further deposited on the support 2 with a suitable incident angle, for example, 45°–70° or 80°–85° (the incident angle means an incident direction of evaporated particles with respect to the normal line perpendicular to the support). With an incident angle ranging from 45° to 70°, the liquid crystal molecules exhibit the homogeneous alignment within the plane of the support, while the longitudinal axes thereof are held normal to the incident direction of the evaporated particles. Nevertheless, with 80° to 85°, the liquid crystal molecules are aligned in parallel with the incident direction.

Provided that the liquid crystal display cell is adapted such that the molecular alignments about the surface of the two electrode supports having the same directionality are orthogonal to each other in this way, the liquid crystal molecules in the display cell will exhibit the twisted structure across the two supports. This results in the TN-FEM (twisted nematic field effect mode) type of liquid crystal displays. However, the resulting TN-FEM type displays using the conventional slant evaporation technique inherently suffer from the following three basic problems.

First, any possible uneven or rugged surface of the supports presents the disadvantage that evaporation from a slant direction is curbed particularly with protrusions in the peripheral area thereof. Even if the SiO deposit film is made thicker to offset the uneven surface, another problem with chemical stability occurs. That is, bubbles are developed by reaction with the liquid crystal.

Secondly, a problem with disclination is experienced. In the case where evaporation is carried out with an incident angle of from 45° to 60°, the shape of the deposited film is symmetric at both sides of the molecular alignment direction while the liquid crystal molecules are oriented orthogonally with respect to the incident direction of the evaporated particles. This makes it difficult to twist the liquid crystal molecules in a certain direction throughout the support, causing twist disclination (see FIG. 2).

Figure 2:
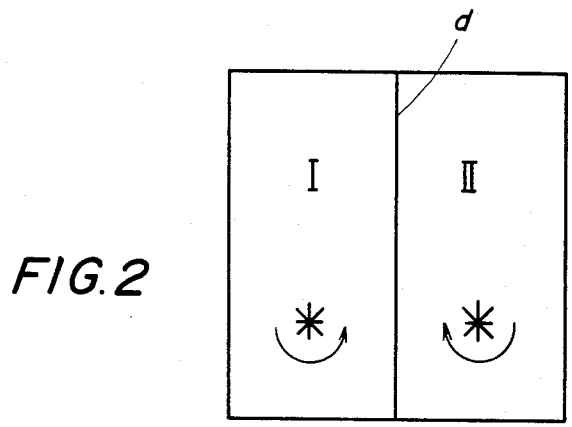
FIGS. 2 and 3 are a plane view and a side view of a prior art liquid crystal display cell.

In FIG. 2, the liquid crystal molecules in the region I twist left and the molecules in the region II twist right so that the twisting direction thereof is different between the regions I and II. This leads to disclination at the boundary between these regions as denoted by the solid line in FIG. 2.

Figure 3:
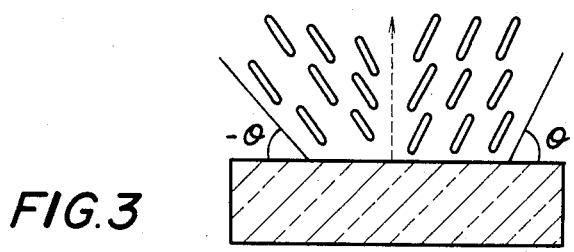

Moreover, since the liquid crystal molecules parallel the surface of the support, upon applied voltage, the rising direction thereof toward an electric field induced by the applied voltage remains unstable, forming domains in the liquid crystal layer and thus tilt disclination (see FIG. 3). FIG. 3 shows that the tilt direction of the liquid crystal molecules is opposite to each other between the regions I and II. With an incident angle of 80° to 85°, twist and tilt disclinations can be almost eliminated or minimized. However, in this case the liquid crystal display cell is disadvantaged in that interference color is inevitably visible throughout the cell and the contrast ratio is much reduced because the liquid crystal molecules are inclined to rise from the surface of the support. Those disadvantages are greatly critical from the standpoints of an easy-to-read and easy-to-manufacture display.

The last important problem is that the slant deposite film of SiO lacks chemical stability against the liquid crystal. This carries much weight for longer use of the liquid crystal display cell. This brings forth the formation of bubbles.

In consequence, a liquid crystal display cell embodying the present invention overcomes those disadvantages with the prior art and assures a quality liquid crystal display by providing a transparent insulating film of a three-layered structure. According to the invention, a liquid crystal display cell comprises a pair of supports at least one of which is a transparent, nematic liquid crystal material having a positive dielectric anisotropy with twisted nematic alignment interposed between the supports, a first insulating layer deposited substantially along the normal direction of one of the supports, a second insulating layer deposited on the first insulating layer in a direction slant to the normal direction of the support, and a third insulating layer deposited on the second insulating layer slantly to a direction rotated 90° from said slant direction while the normal line of the support serves as the rotation axis thereof, thereby providing a three-layered alignment film.

In one preferred form, the second insulating layer is evaporated at a selected angle of from 45°–60° with respect to the normal line of the support, while the third insulating layer is evaporated at a selected angle of from 80° to 85° with respect to the normal line of the support.

Figure 4:
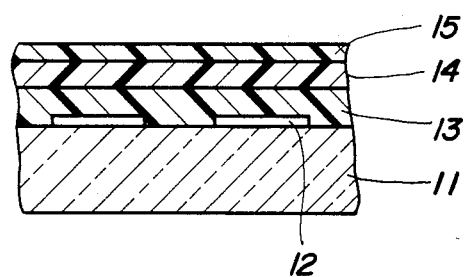
FIG. 4 is a cross sectional view of one of supporting plates of a liquid crystal display cell embodying the present invention.

Turning now to FIG. 4, on a non-finished or faintly uneven surface of a glass support 11 carrying a patterned transparent conductive film 12 of $In_2O_3$ there is evaporated a thin film 13 of $SiO_2$ or the like with a thickness of approximately 1000 Å in the normal or perpendicular direction of the support surface, which is the first layer of the alignment film. Insulating material SiO is evaporated at a selected incident angle of 45°–60° from the direction A of FIG. 5 with resulting in the second layer 14 of approximately 10 Å to approximatley 500 Å. Thereafter, the insulating material of SiO is further evaporated at a selected incident angle of 80°–85° from the direction B of FIG. 5 thereby to form the third insulating layer 15 with a less than 30 Å thickness (preferably, 1.5 Å–10 Å). The function of the first deposit layer 13 is to overcome the first named problem, namely, the adverse effects of the uneven surface of the support, through the second and third films are thinner. The first insluting layer can afford very excellent molecular alignment.

The second deposite insulating layer is to assure the molecular alignment in a certain direction and therefore a twisted structure of the liquid crystal molecules.

The third insulating film gives the second deposite insulating film asymmetry useful to overcome the second problem set forth above, the disclination. The chemical stability of the SiO deposite film against the liquid crystal is guaranteed by restraining a sum of the thicknesses of the second and third SiO deposit layers below approximately 500 Å. Thus, the three-layered alignment film of the present invention provides stable and good alingment of the liquid crystal molecules over long use of the display cell. While FIG. 4 illustrates only one support of the cell structure carrying the above mentioned alignment structure, it is apparent in the art that the cell structure needs two supports carrying the same alignment structure.

The following sets forth one preferred embodiment of the present invention.

Figure 5:
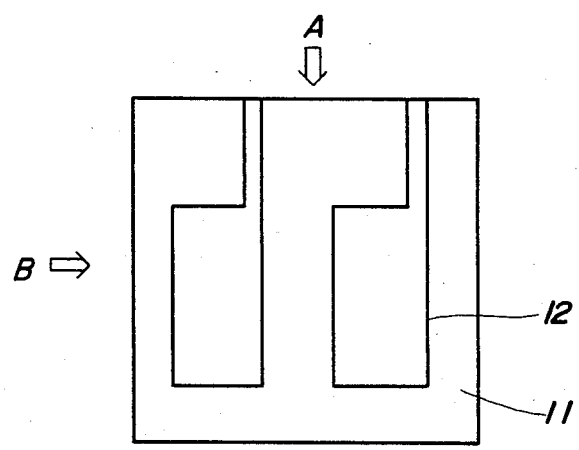
FIG. 5 is a plane view for explanation of evaporation direction in manufacturing the support plate of the present invention.

After $In_2O_3$ with 5.0 wt% of $SnO_2$ added is evaporated with a thickness of 500 Å, $SiO_2$ is evaporated as the first alignment layer with a thickness of approximately 1000 Å from the normal direction by the electron beam method and the second layer of SiO of 25 Å thick is slant-evaporated at an incident angle of 60° from the direction of the arrow A of FIG. 5. Moreover, the third layer SiO of 5 Å thick is evaporated at an incident angle of 85° from the direction B of FIG. 5.

Two supports of the liquid crystal cell are prepared in accordance with the above described manner. These two supports are positioned and secured through a 10 μm spacer such that the slant evaporation directions A of the second SiO layer are orthogonal to each other.

The liquid crystal material injected into the cell is E-8 biphenyl liquid crystal available from BDH Co.

The resulting liquid crystal cell obtained satisfactory results as the liquid crystal molecules are chemically stable without disturbance due to nonuniformity of the support surface or twist disclination. The TN-FEM liquid crystal display cell using a polarizer HN 42 manufactured by Polaroid Co. showed a contrast ratio of 50:1 and response properties with 70 ms of the rise time and 120 ms of the decay time at 25° C. and 5 V.

The invention being thus described, it will be obvious that the same may be varied in many ways. Such modifications are not to be regarded as a departure from the spirit and scope of the invention, and all such modifications are intended to be included within the scope of the following claims.

What is claimed is:

1. A holding plate for a twisted nematic field effect mode liquid crystal display comprising:
    a support;
    conductive electrodes formed on said support;
    a $SiO_2$ layer formed over said support and said conductive electrodes;
    a first SiO layer formed on said $SiO_2$ layer, said first SiO layer being slant deposited at a first acute angle from the plane of said support and from a first direction along the plane of said support; and
    a second SiO layer formed on said first SiO layer, said second SiO layer being slant deposited at a second acute angle from the plane of said support and from a second direction along the plane of said support, said second acute angle being smaller than said first acute angle, said second direction being substantially normal to said first direction.

2. The holding plate of claim 1 wherein the total thickness of said $SiO_2$ layer and said first and second $S_iO$ layers is greater than 1000 Å.

3. The holding plate of claim 1 wherein said $SiO_2$ layer is approximately 1000 Å thick.

4. The holding plate of claim 3 wherein said $SiO_2$ layer is deposited in a direction normal to the plane of the support.

5. The holding plate of claim 1 or 4 wherein the total thickness of said first and second SiO layers is less than 500 Å.

6. The holding plate of claim 1 wherein said first SiO layer is between 10 Å and 500 Å thick.

7. The holding plate of claim 1 wherein said second SiO layer is less than 30 Å thick.

8. The holding plate of claim 6 wherein said first acute angle is in the range of 30° to 45°.

9. The holding plate of claim 7 wherein said second acute angle is in the range of 5° to 10°.

10. The holding plate of claim 8 wherein said first acute angle is approximately 30°.

11. The holding plate of claim 10 wherein said first SiO layer is approximately 25 Å thick.

12. The holding plate of claim 9 wherein said second SiO layer is approximately 5 Å thick.

13. A twisted nematic field effect mode liquid crystal display well comprising:
    a pair of supports having conductive electrodes formed thereon;
    a liquid crystal material including a plurality of liquid crystal molecules disposed between said supports; and
    an alignment structure formed on each of said pair of supports for ensuring uniform alignment of the liquid crystal molecules, said structure including;
    a $SiO_2$ layer formed over one of said supports and said conductive electrodes;
    a first SiO layer formed on said $SiO_2$ layer, said first SiO layer being slant deposited at first acute angle from the plane of said support and from a first direction along the plane of said support; and a second SiO layer formed on said first SiO layer, said second SiO layer being slant deposited at a second acute angle from the plane of said support and from a second direction along the plane of said support, said second acute angle being smaller than said first acute angle, said second direction being substantially normal to said first direction.

14. The display of claim 13 wherein the total thickness of said SiO$_2$ layer and said first and second SiO layer is greater than 1000 Å.

15. The display of claim 13 wherein said SiO$_2$ layer is approximately 1000 Å thick.

16. The display of claim 15 wherein said SiO$_2$ layer is deposited in a direction normal to the plane of the support.

17. The display of claim 13 or 16 wherein the total thickness of said first and second SiO layers is less than 500 Å.

18. The display of claim 13 wherein said first SiO layer is between 10 Å and 500 Å thick.

19. The display of claim 13 wherein said second SiO layer is less than 30 Å thick.

20. The display of claim 18 wherein said first acute angle is in the range of 30° to 45°.

21. The display of claim 19 wherein said second acute angle is in the range of 5° to 10°.

22. The display of claim 20 wherein said first acute angle is approximately 30°.

23. The display of claim 22 wherein said first SiO layer is approximately 25 Å thick.

24. The display of claim 21 wherein said second SiO layer is approximately 5 Å thick.

* * * * *